(No Model.)

J. C. DE WYELL.
CIRCULAR BUTTRESS.

No. 423,417. Patented Mar. 18, 1890.

Witnesses:
Geo. R. Clark
J. B. Patterson

Inventor.
John C. De Wyell

UNITED STATES PATENT OFFICE.

JOHN C. DE WYELL, OF LIVONIA, NEW YORK.

CIRCULAR BUTTRESS.

SPECIFICATION forming part of Letters Patent No. 423,417, dated March 18, 1890.

Application filed July 15, 1889. Serial No. 317,629. (No model.)

*To all whom it may concern:*

Be it known that I, JOHN C. DE WYELL, a citizen of the United States, residing at Livonia, in the county of Livingston and State of New York, have invented a new and useful Buttress, of which the following is a specification.

My invention relates to improvements in buttresses for paring and fitting horses' hoofs for the shoes; and the objects of my circular buttress are, first, to pare the hoof by moving the knife in a circle and retain the original form of the hoof, and, second, to pare the hoof evenly, so that the shoe will rest on the outer shell of the hoof, thus bringing the weight of the horse on the proper bearings. I attain these objects by the mechanism illustrated in the accompanying drawings, forming a part hereof, wherein—

Figure 1:
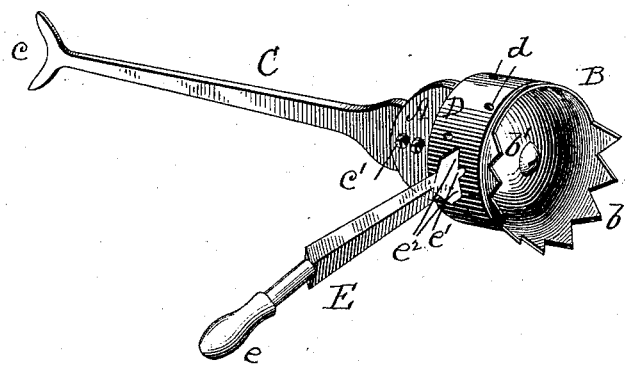
Figure 2:
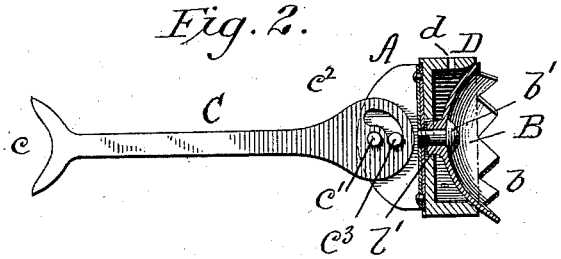

Figure 1 is a view in perspective, and Fig. 2 a central sectional elevation, of a circular buttress constructed according to my invention.

The reference-letter A indicates the body of the implement, and B a concave plate having spurs $b$ upon its edge, by which the implement is retained in position against the bottom of the hoof when in use, which plate is secured to the said body by a screw, as at $b'$, that passes through a projection $b^2$ at the rear of said plate.

C is a brace by which the implement is held by the operator, which brace has a crotched end to fit the shoulder, as at $c$, and is pivoted to the body A at $c'$, and has a limited lateral movement by reason of a slot $c^2$ therein and pin $c^3$, that passes through said slot of the brace and into the body of the implement.

D is a band or collar having a series of holes $d$ through the rim thereof, which collar freely revolves upon the central projection $b^2$ of the plate B, as shown in Fig. 2.

E is the cutting instrument or knife that is used in connection with the circular buttress, which knife has a handle $e$ and is formed with a projection $e'$, that terminates in a shoulder $e^2$, which projection $e'$ is adapted to fit the holes $d$ in the rim of the collar D, as shown in Fig. 1.

To use the implement herein described, it is placed against the horse's hoof over the frog and so held by pressure against the brace C, which causes the teeth $b$ to indent themselves into the hoof, thus keeping the implement in proper position for effective operation. The end $e'$ of the knife E is now inserted into one of the series of holes $d$ in the band D, which brings the cutting-edge of said knife across and against the bottom of the hoof. Upon moving the knife around in a circle the outer surface of the hoof will therefore be evenly cut and trimmed upon both sides of the frog.

Having thus described my invention, I claim as new, and desire to secure by Letters Patent of the United States—

1. The circular buttress composed of body A, concave plate B, having teeth $b$, band D, with holes $d$, and combined with a suitable handle, and a cutting-knife E, having a projection $e'$ to enter the holes $d$ of the band D, all constructed and arranged to operate substantially as and for the purposes described.

2. In a circular buttress of the nature described, in combination with the body A, plate B, band D, with holes $d$, and knife E, with end $e'$, of the brace C, with crotched end $c$, pivoted to the body, substantially as shown and described, for the purposes specified.

JOHN C. DE WYELL.

Witnesses:
J. B. THURSTON,
GEO. R. CLARK.